Jan. 25, 1966 P. CHIAIA 3,230,837
UNIVERSAL MILLING MACHINE
Filed June 14, 1963 4 Sheets-Sheet 3

INVENTOR
Paolo Chiaia
BY
Michael S. Striker,
ATTORNEY

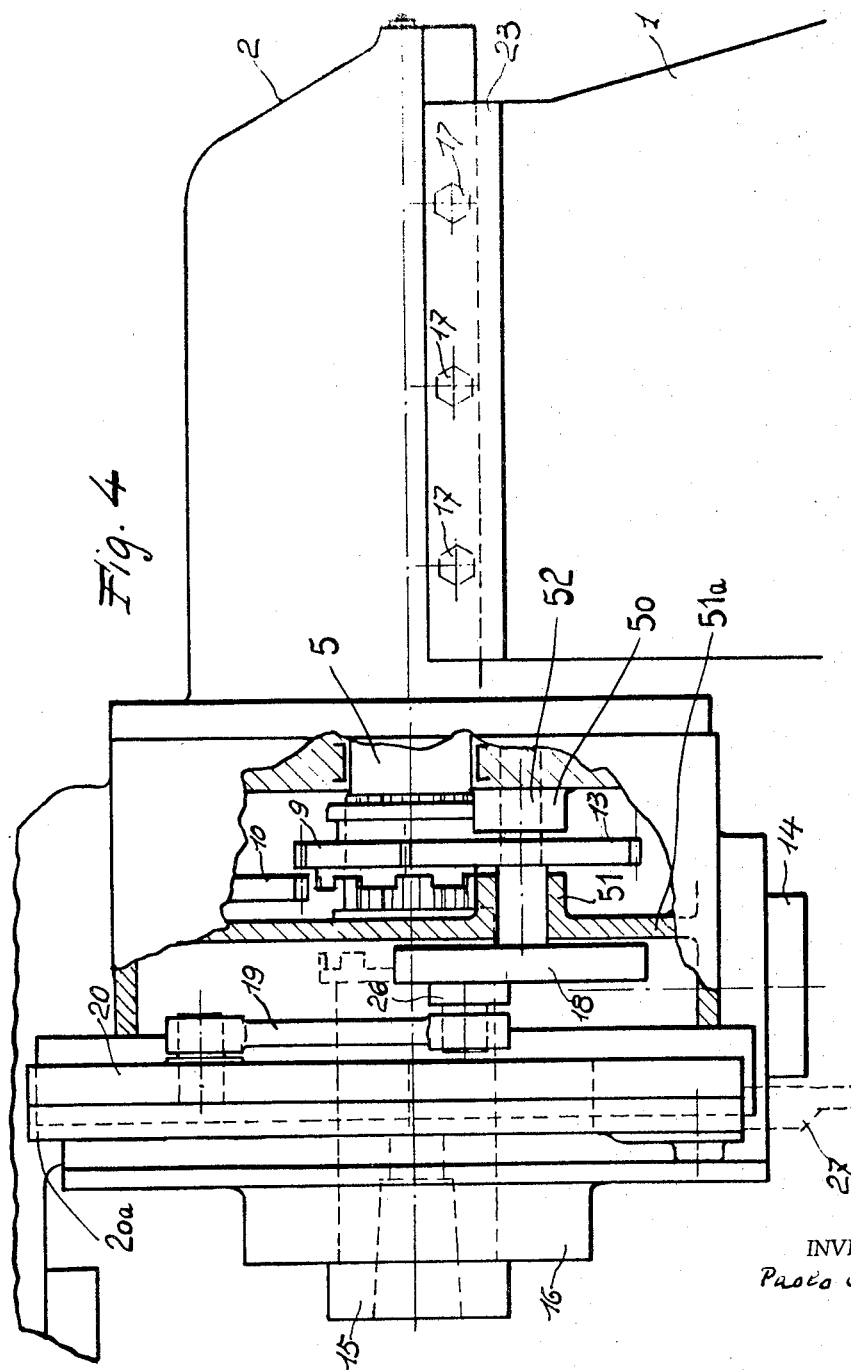

United States Patent Office 3,230,837
Patented Jan. 25, 1966

3,230,837
UNIVERSAL MILLING MACHINE
Paolo Chiaia, Via Ghiberti 11, Milan, Italy
Filed June 14, 1963, Ser. No. 288,000
Claims priority, application Italy, June 20, 1962,
12,400/62
6 Claims. (Cl. 90—17)

This invention concerns a universal milling machine that is provided with a ram mounted revolving head, whereby the possibility is given to perform any milling and slotting operation without the use of removable attachments.

As already well known, there are many types of milling machines which are designated according to the position of rotation axis of cutter spindle. Thus the milling machine which spindle rotates on an horizontal axis, is called horizontal milling machine, while the milling machine which spindle rotates on a vertical axis, is called vertical milling machine. Finally, when the cutter spindle or spindles can be set on either vertical or horizontal axes, or better at any angle of inclination—as in the case of this invention—then the machine is called universal milling machine.

Many designs of machine tools of the above stated type are already known; however, they are far from meeting all requirements which can be set, in a workshop, upon a machine of the above specified type.

In fact, the already known universal milling machine will work satisfactorily only in the case of horizontal milling operations, while all vertical or inclined milling operations can be performed only with the aid of attached, or mounted-on attachments, designed to convert the horizontal prime motion into a derived, vertical or inclined motion. However, such attachments, due to their own nature, are not in condition to withstand the high torsional stresses inherent in the milling operations, whereby they do not allow to take deep passes without incurring strong vibrations, or even heavy troubles or breakages.

Thus, the possibilities offered by the universal milling machines in the field of vertical milling operations are much restricted whereby it has been recognized that it is generally uneconomical to have vertical milling operations carried out on them, and that it is better to have recourse to the proper vertical milling machines for such operations.

Another drawback of the so-called universal milling machine consists in the difficulty and time required to convert the setting-up of same machine from the horizontal milling to vertical, or oblique milling or slotting. As a matter of fact, for the conversion from one to another type of operation it is necessary to replace a number of machine components with other attachments, e.g., the vertical milling attachment, the cutter arbor, the slotting attachment, the cutters, and so on.

Since the machine must be rather frequently converted from one to another type of work, the necessity is felt to provide a machine which allows to perform any milling and slotting operations, and which can be quickly and easily converted from one to another type of operation without having to replace any component, or to add any attachments.

To obviate the above stated drawbacks, this invention proposes a machine tool, as universal milling machine, that allows to perform all vertical, horizontal or inclined milling operations, and that can be converted from one to another type of work without having to replace any component, or to add any attachment, and not even—at least in the most of cases—to remove the cutters from their spindles.

The invention substantially provides a universal milling machine comprising two spindles and a slotting device that is fitted on the ram column with a change gearbox for the transmission of drive to one only of the three driven units, the latter being fitted with members which are always directly driven from same main driving shaft, whereby the drive is parallel-derived, and not series-derived, as in the already known milling machines that are fitted with attachments.

This invention will be better understood from a consideration of the following detailed description, taken with the accompanying drawings, both description and drawings being given only as a not restrictive example.

FIG. 4 is a partly sectioned side view of the drive, from the side of the slotting device.

Figure 1:
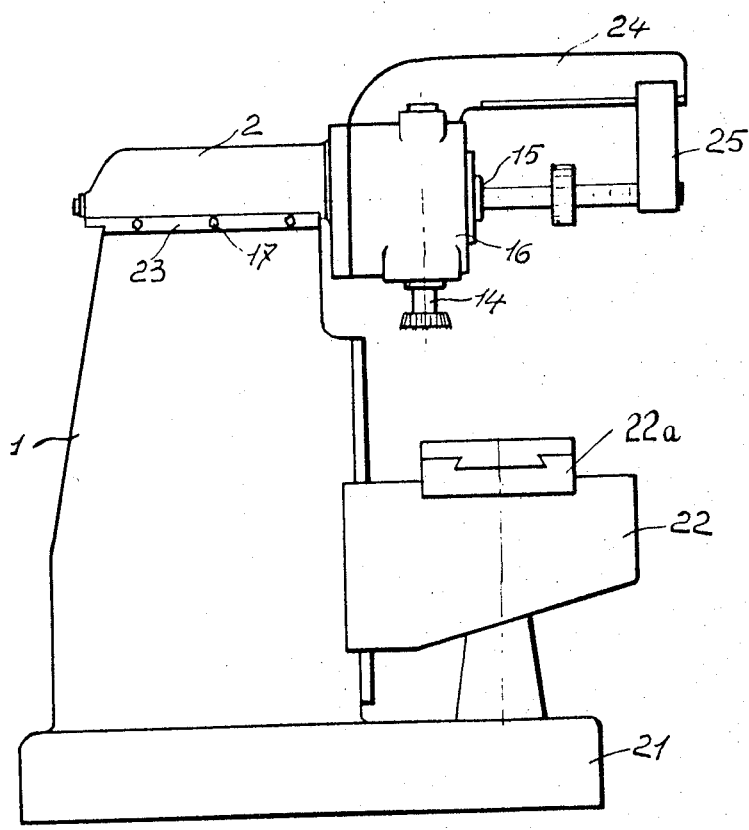
FIG. 1 is a side view of the universal milling machine according to the invention.
Figure 2:
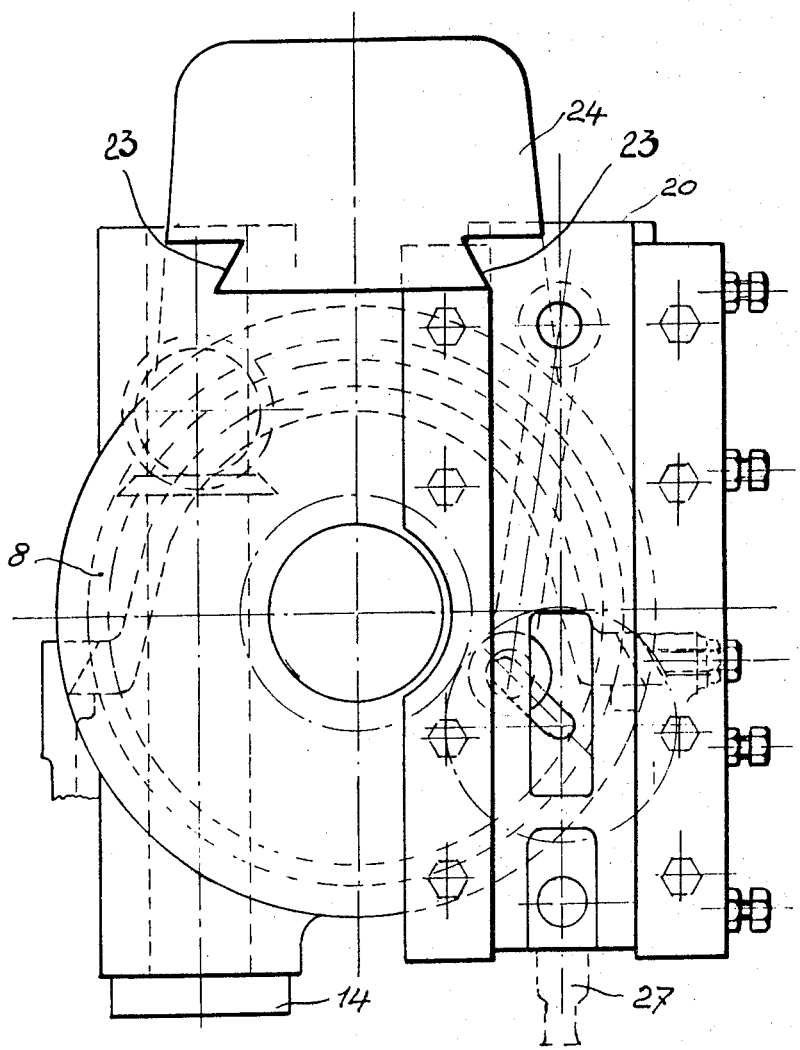
FIG. 2 is a view of the revolving head, as set-up for horizontal milling operations.
Figure 3:
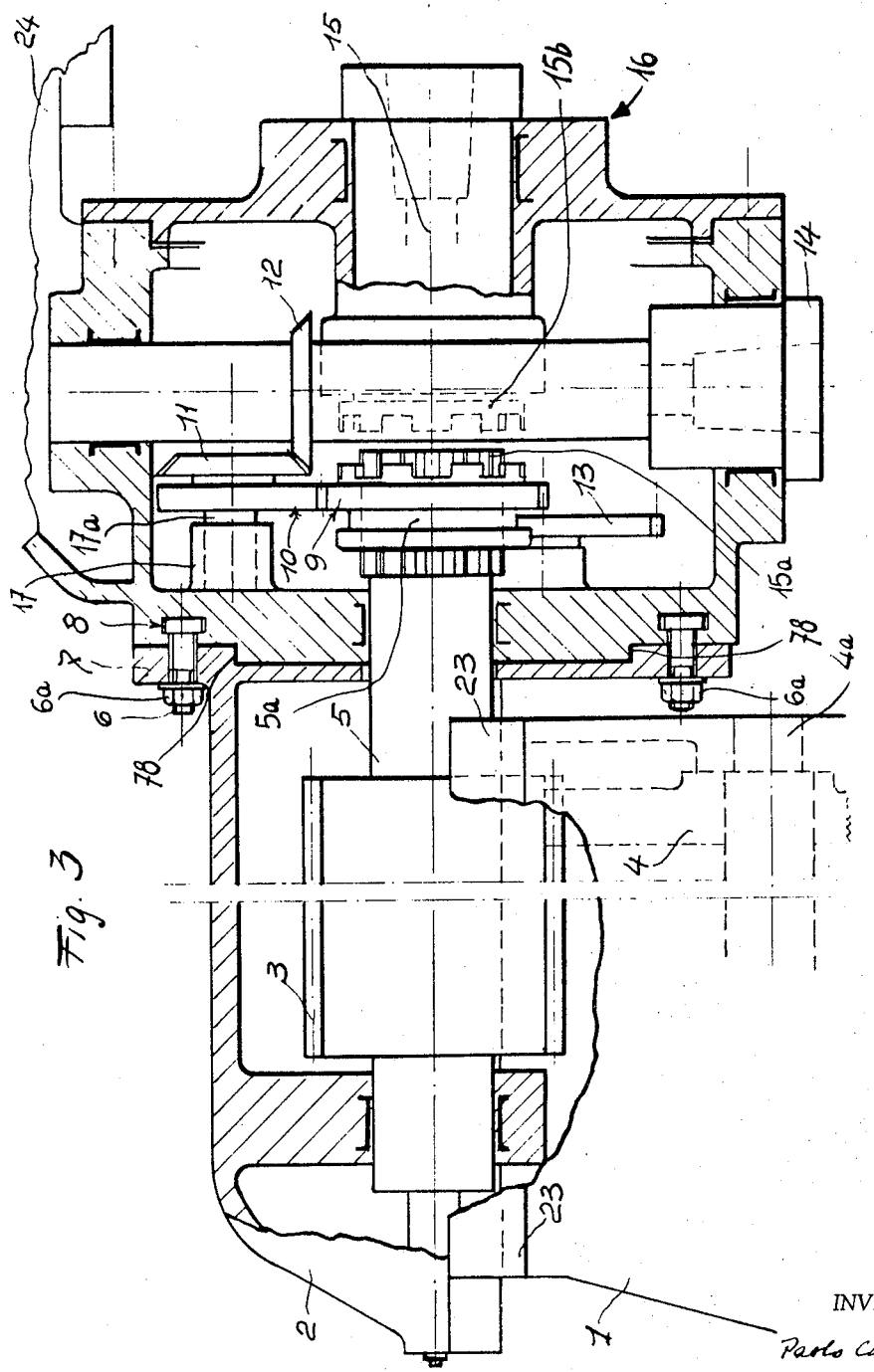
FIG. 3 is a partly sectioned side view of the drive, from the side of the vertical cutter spindle.

The universal milling machine according to the invention substantially consists of a base 21, carrying a knee 22 with a worktable 22a that may be of any, already known type, and an upright 1, with a slide 2 fitted at the upper end thereof, e.g., by means of dovetailed guides 23.

Said slide 2 can be thus moved longitudinally along the guides 23, and locked in any required position by means of set screws 17 or equivalent means.

The fore end of slide 2 is formed with a disc 7, whereon the proper milling head 16 is rotatably fitted. Such head is provided with a support 24 (or over-arm) for a stay 25.

The disc 7 and the milling head can be connected with one another by, e.g., stepped complemental surfaces 78. Such connection can be locked by means of tierods 6, whose heads are slidingly fitted in T-slots 8, and that can be tightened by nuts 6a, whereby the milling head 16 can be locked in any angular position in respect of the slide 2. As it can be readily appreciated, recourse could be made to any other locking means, equivalent to nuts 6a, to make the locking operation more easy.

A horizontal cutter spindle 15, a vertical cutter spindle 14 and a slotting attachment are fitted in the head 16. Said slotting attachment consists of a vertical slide 20, carrying the slotting tool 27, and slidingly fitted in a guide 20a (see FIG. 4).

The power for the cutter spindles 14, 15 and the slide 20, is parallel derived, through a change gearbox, which will be described in more detail later, from a main shaft 5; a gear 3, keyed on latter shaft, is permanently in mesh with a stationary gear 4, keyed on a shaft 4a, such shaft being supported by suitable bearings in the upright 1, and driven by any suitable known means, e.g., an electric motor, back gear or the like.

The main shaft 5 extends into the milling head 16, and is fitted with a gear and a coupling, axially sliding thereon, but torsionally connected therewith.

A driven shaft 17a, that is supported by a bushing 17 in the head 16, is fitted with a gear 10, which can be brought in mesh with the sliding gear 5a, as well as with a bevel gear 11, that is kept permanently in mesh with the bevel gear 12, keyed on the vertical shaft 14.

A half-coupling 15a, designed to cooperate with the half-coupling 15b with which the horizontal shaft 15 is provided, is secured to front side of sliding gear 5a.

A gear 13, designed to get engaged with the gear 9 of the sliding unit 5a, is keyed on a second driven shaft 52, that is supported by two bushings 50 and 51, which are fast with two opposite walls of the head 16. Beyond the wall 51a, the shaft 52 is fitted with a plate 18 formed with a cam 26, that is designed to drive, through a connecting rod 19, the slide 20 of slotting device, along its guide 20a. As it can readily be appreciated, the sliding gear 5a may be driven by an already known means, e.g., a forked lever (not shown).

The operation of the universal milling machine according to the invention is clearly evident from the preceding description and the accompanying drawings. It will be sufficient to emphasize the possibility to have the tool positioned at will in respect of work which is being milled, by moving the slide 2 along the guide 23, and locking it then in the required position by means of the set screws 17, and keeping in mind that during such motion, the gear 3, which is moved together with said slide, is kept always in mesh with the gear 4, fitted on the upright 1. The drive can be shifted from one, to any other cutter spindle, by merely throwing out of mesh, and then bringing again into mesh the corresponding gears by means of the sliding unit 5, whereby one only of cutters is driven, while all other tools are kept out of operation. Moreover, the whole head 16 can be turned after having loosened the nuts 6a, and then locked at the required angle of inclination of shaft 14, whereby cuts of any inclination can be taken with the related tool.

As it is manifest from what precedes, a particular feature of this invention is that the machine can be converted from one, to another type of operation in an unusually easy and quick manner, and an added advantage is that the drive of each tool is directly derived, as an essential principle, from a main driving shaft, without the interposition of any removable transmission member, or conversion of the main drive.

While one embodiment form only of the invention has been described, any person skilled in the art may readily conceive many modifications and changes thereof, which are however to be considered as covered by the protection as applied for.

What I claim is:

1. A universal milling machine comprising, in combination, an upright support; a horizontal slide mounted on said support movable in horizontal direction relative thereto; a milling head mounted at one end of said slide angularly adjustable relative thereto about a horizontal axis; locking means cooperating with said milling head for locking the same on said slide in any angularly adjusted position; a driven main shaft supported by said slide and extending along said axis; a horizontal tool spindle turnably carried by said milling head and being axially aligned with said main shaft; a second tool spindle turnably carried by said milling head and extending normal to said horizontal tool spindle; and combined coupling and transmission means carried by said milling head for selectively coupling said main shaft to said horizontal and said second tool spindle so that either said horizontal or said second tool spindle may be driven by said main shaft.

2. A universal milling machine comprising, in combination, an upright support; a horizontal slide mounted on said support movable in horizontal direction relative thereto; a milling head mounted at one end of said slide angularly adjustable relative thereto about a horizontal axis; locking means cooperating with said milling head for locking the same on said slide in any angularly adjusted position; a driven main shaft supported by said slide and extending along said axis; a horizontal tool spindle turnably carried by said milling head and being axially aligned with said main shaft; a second tool spindle turnably carried by said milling head and extending normal to said horizontal tool spindle; and combined coupling and transmission means carried by said milling head for selectively coupling said main shaft to said horizontal and said second tool spindle so that either said horizontal or said second tool spindle may be driven by said main shaft, said combined coupling and transmission means comprising a first bevel gear fixed to said second tool spindle, a second bevel gear meshing with said first bevel gear and mounted in said milling head turnable about a second axis parallel to that of said main shaft, a spur gear fixed to said second bevel gear for rotation therewith, and a sliding gear and coupling unit mounted on said main shaft for rotation therewith and movable in axial direction between a first position in which said sliding gear and coupling unit is meshingly connected with said spur gear to drive the latter and therewith said second tool spindle and a second position in which said unit connects said main shaft with said horizontal tool spindle for turning the latter.

3. A universal milling machine comprising, in combination, an upright support; a horizontal slide mounted on said support movable in horizontal direction relative thereto; a milling head mounted at one end of said slide angularly adjustable relative thereto about a horizontal axis; locking means cooperating with said milling head for locking the same on said slide in any angularly adjusted position; a driven main shaft supported by said slide and extending along said axis; a horizontal tool spindle turnably carried by said milling head and being axially aligned with said main shaft; a second tool spindle turnably carried by said milling head and extending normal to said horizontal tool spindle; a guide carried by said milling head extending substantially normal to said main shaft; a tool slide reciprocably mounted in said guide and adapted to carry at one end thereof a slotting tool; an auxiliary shaft carried by said spindle head substantially parallel to said main shaft; eccentric means connecting said auxiliary shaft to said tool slide for reciprocating the latter during rotation of said auxiliary shaft; and combined coupling and transmission means carried by said milling head for selectively coupling said main shaft to said horizontal spindle, said second tool spindle and said auxiliary shaft so that either said horizontal spindle, or said second tool spindle, or said auxiliary shaft may be driven by said main shaft.

4. A universal milling machine comprising, in combination, an upright support; a horizontal slide mounted on said support movable in horizontal direction relative thereto; a milling head mounted at one end of said slide angularly adjustable relative thereto about a horizontal axis; locking means cooperating with said milling head for locking the same on said slide in any angularly adjusted position; a driven main shaft supported by said slide and extending along said axis, said main shaft having a free end extending into said milling head; a horizontal tool spindle turnably carried by said milling head axially aligned with said main shaft, said horizontal tool spindle having one end facing and spaced from said free end of said main shaft and having an opposite end extending beyond said milling head; a second tool spindle turnably carried by said milling head extending normal to said horizontal tool spindle; a first bevel gear fixed to said second tool spindle for rotation therewith; a first auxiliary shaft turnably mounted in said milling head parallel to said main shaft; a second bevel gear mounted on said first auxiliary shaft for rotation therewith and meshing with said first bevel gear; a first spur gear on said first auxiliary shaft fixed to said second bevel gear for rotation therewith; a guide carried by said milling head extending substantially normal to said main shaft; a tool slide reciprocably mounted in said guide and adapted to carry at one end thereof a slotting tool; a second auxiliary shaft carried by said spindle substantially parallel to said main shaft; a second spur gear mounted on said second auxiliary shaft for rotation therewith; a crank mounted on said second auxiliary shaft for rotation therewith; a tie rod tiltably connected at opposite ends thereof to said crank and said tool slide, respectively, so that said tool slide is reciprocated along said guide during turning of said second auxiliary shaft; coupling means fixedly mounted on said one end of said horizontal tool spindle; and a coupling unit mounted on said free end of said main shaft for rotation therewith and movable in axial direction, said coupling unit including a spur gear and complementary coupling means adapted to cooperate with said coupling means on said horizontal tool spindle, said unit being movable in axial direction of said main shaft between a first position in which said complementary coupling means engages said coupling means on said horizontal tool spindle so that the latter is driven by said main shaft, a second position in which said spur gear of said unit engages with said first spur gear so that said main shaft drives said second tool spindle, and a third position in which said spur gear of said unit engages said second spur gear so that said main shaft drives said second auxiliary shaft and thereby reciprocates said tool slide.

5. A universal milling machine as set forth in claim 1 and including means for locking said horizontal slide on said upright support in any horizontally adjusted position.

6. A universal milling machine as set forth in claim 1 and including an elongated spur gear fixed to said main shaft for rotation therewith; a driven shaft carried by said upright support; and a spur gear carried by said driven shaft for rotation therewith and meshing with said elongated spur gear on said main shaft and said elongated spur gear having such a length to remain in engagement with said spur gear on said driven shaft during horinzontal adjustment of said horizontal slide.

References Cited by the Examiner
UNITED STATES PATENTS

| | | | |
|---|---|---|---|
| 508,029 | 11/1893 | Lidback | 29—30 |
| 1,269,727 | 6/1918 | Metz | 90—17 |
| 1,499,084 | 6/1924 | Sudstrand | 90—17 |
| 2,532,591 | 12/1950 | Armitage et al. | 90—17 X |
| 3,096,687 | 7/1963 | Klopp et al. | 29—26 X |

FOREIGN PATENTS

| | | |
|---|---|---|
| 655,218 | 9/1938 | Germany. |
| 10,960 | of 1902 | Great Britain. |
| 219,921 | 10/1924 | Great Britain. |

WILLIAM W. DYER, Jr., *Primary Examiner.*